(No Model.)
W. L. WARNER.
PIPE COUPLING.
No. 351,414. Patented Oct. 26, 1886.
Fig. 1
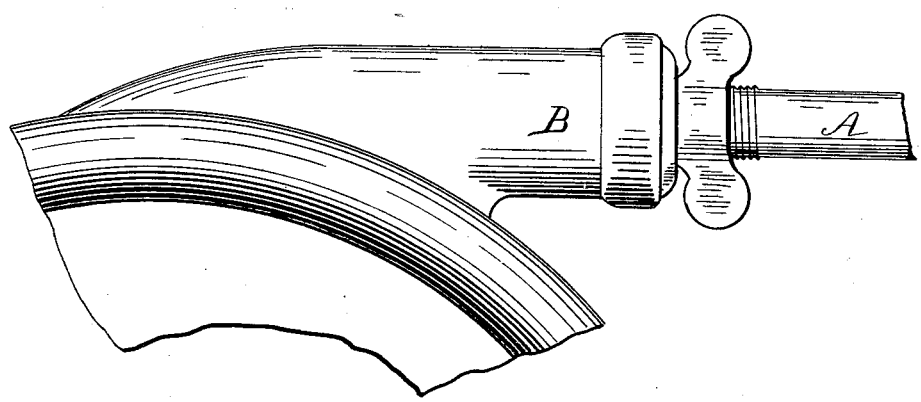
Fig. 2
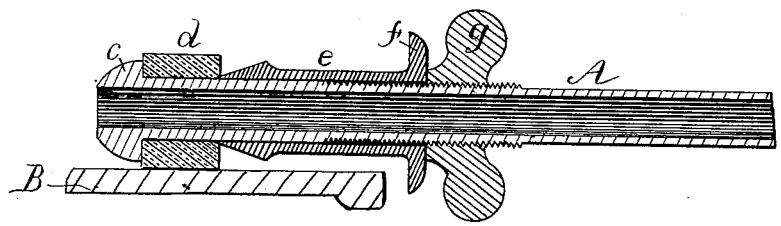
Fig. 3     Fig. 4     Fig. 5     Fig. 6
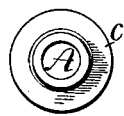  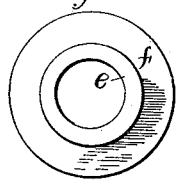 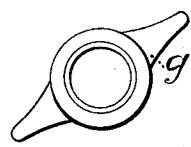
WITNESSES:
George L. Barnes
H. O. Nettleton
INVENTOR
William L. Warner
BY
Julius Twiss.
ATTORNEY

UNITED STATES PATENT OFFICE.

WILLIAM L. WARNER, OF NEW HAVEN, CONNECTICUT.

PIPE-COUPLING.

SPECIFICATION forming part of Letters Patent No. 351,414, dated October 26, 1886.

Application filed July 21, 1886. Serial No. 208,590. (No model.)

*To all whom it may concern:*

Be it known that I, WILLIAM L. WARNER, a resident of the town and county of New Haven, and State of Connecticut, have invented new and useful Improvements in Pipe-Couplings, of which the following is a specification.

The object of my invention is to provide a pipe joint or union for coupling metal pipes to pipes made of earthenware or other material not susceptible of being threaded. It is especially adapted for connecting flush-pipes to closet-bowls; and the invention consists in the novel construction of the joint or coupling, as hereinafter more fully described and claimed.

In the accompanying drawings, Figure 1 is a view of my improved joint, showing a metal pipe coupled to an earthenware nozzle. Fig. 2 is a sectional view through the parts of the coupling. Figs. 3, 4, 5, and 6 are detailed views of the parts of the coupling.

Referring to the drawings, A designates a metal pipe, and B an earthenware pipe nozzle or stem, to which the metal pipe is to be coupled. The metal pipe is formed with a flange or shoulder, $c$, at its end, and an elastic band or coil, $d$, is fitted upon the pipe, bearing against the flange, as shown. A sleeve or bushing, $e$, is fitted to slide loosely upon the pipe, and is formed with a conical end adapted to wedge between the collar $d$ and the pipe. The opposite end of the sleeve is formed with a flange, $f$, which is adapted to bear against the end of the earthenware pipe. The metal pipe is threaded for a short distance under and outside of the end of the sleeve or bushing, and receives a thumb-nut, $g$. The thumb-nut screws against the flanged end of the sleeve $e$, and forces the conical end of the sleeve under the elastic collar $d$, thus expanding the collar and also compressing it endwise. The metal pipe is inserted within the earthen pipe, with the elastic collar $d$ snugly fitting the walls of the earthen pipe. The sleeve or bushing $e$ is then screwed up by means of the thumb-nut $g$ until the collar tightly fills the annular space between the pipes.

It will be seen that if the end of the sleeve or bushing is made flat instead of tapering and abuts against the collar, a tight joint will be formed; but it is preferable to construct the sleeve as shown, and produce a wedging action between the sleeve and collar. An ordinary nut may be used in place of a thumb-nut, but the latter is preferable.

By means of this coupling a metal pipe may be connected to an earthen or other glazed pipe as tightly as desired. The pipes may also be coupled or uncoupled with ease and dispatch, and if the joint becomes loose it can readily be made tight by a turn of the thumb-nut.

I claim as new and desire to secure by Letters Patent—

1. In combination with the pipe having a flange or collar on its end, the elastic bushing surrounding the pipe and abutting against the collar thereon, the sleeve on the pipe having its end engaging the elastic bushing made conical to expand the end of the same while forcing the bushing against the collar, and means, substantially as described, for moving the sleeve along the pipe and holding it at any adjustment, substantially as and for the purpose set forth.

2. In a joint for coupling earthenware and metal pipes together, in combination with the exterior pipe, the inner pipe provided with a flange and externally threaded, the elastic cylinder or bushing surrounding the pipe, the sleeve on the pipe extending within the exterior pipe to engage the elastic bushing, and provided with a flange to engage the outer end of the exterior pipe, and a nut on the interior pipe engaging the outer end of the sleeve, substantially as and for the purpose described.

3. In combination with the exterior pipe, the interior pipe having a flange on its inner end, the elastic bushing around the pipe and against the flange, the sleeve on the pipe having the conical end engaging the bushing and provided with a flange engaging the outer end of the exterior pipe, and a nut screwed on the inner pipe engaging the outer end of the sleeve, substantially as and for the purpose specified.

WILLIAM L. WARNER.

Witnesses:
 JULIUS TWISS,
 GEORGE L. BARNES.